United States Patent
Morisse

(10) Patent No.: US 9,563,796 B1
(45) Date of Patent: Feb. 7, 2017

(54) RADIO FREQUENCY AND NEAR FIELD ID TAGS WITH ENLARGED COIL ANTENNA FOR USE WITH SYNTHETIC GRASS MARKERS

(71) Applicant: PHMPHILIPPE MORISSE SAS, Giscaro (FR)

(72) Inventor: Philippe Marc Francois Morisse, Giscaro (FR)

(73) Assignee: PHMPHILIPPE MORISSE SAL, Giscaro (FR)

( * ) Notice: Subject to any disclaimer, the term of this patent is extended or adjusted under 35 U.S.C. 154(b) by 0 days.

(21) Appl. No.: 14/977,906

(22) Filed: Dec. 22, 2015

(51) Int. Cl.
| | |
|---|---|
| *G06K 19/077* | (2006.01) |
| *A41G 1/00* | (2006.01) |
| *G06K 7/10* | (2006.01) |

(52) U.S. Cl.
CPC .......... *G06K 7/10366* (2013.01); *A41G 1/009* (2013.01); *G06K 19/0775* (2013.01); *G06K 19/07758* (2013.01)

(58) Field of Classification Search
CPC .............. A41G 1/009; G06K 19/07758; G06K 19/0775; G06K 19/041; G06K 19/047; G09F 3/00
See application file for complete search history.

(56) References Cited

U.S. PATENT DOCUMENTS

| | | | |
|---|---|---|---|
| 9,147,150 B2 | 9/2015 | Morisse | |
| 2005/0242949 A1* | 11/2005 | Morehouse | ........ G06K 17/0022 340/539.26 |
| 2007/0296597 A1* | 12/2007 | Nizzola | ................ G06K 19/041 340/572.8 |
| 2013/0206028 A1* | 8/2013 | Burdine | .................. F42B 23/04 102/424 |
| 2015/0227831 A1* | 8/2015 | Morisse | ........... G06K 19/07758 235/492 |

FOREIGN PATENT DOCUMENTS

| | | |
|---|---|---|
| WO | WO 9512441 | 5/1995 |
| WO | WO 2008068296 | 6/2008 |

* cited by examiner

*Primary Examiner* — Dionne H Pendleton

(57) ABSTRACT

A synthetic grass implant/marker that serves as a surface mounted visual marker for a feature or device located nearby or underground and has all the features and advantages of such a synthetic grass implant, and that additionally includes an externally mounted RFID and coil antenna mounting device having a cavity in which is mounted an RFID device such as an RFID tag or chip that can programmed with information concerning the feature or device it is marking, and which information can be obtained by utilizing an RFID reader to obtain the stored information from the implant/marker, as well as a coil antenna for the RFID device. Legs on the externally mounted RFID and coil antenna mounting device interconnect with holes located in a top surface of the implant/marker to mate the two pieces together.

5 Claims, 5 Drawing Sheets

(Prior Art)

(Prior Art)

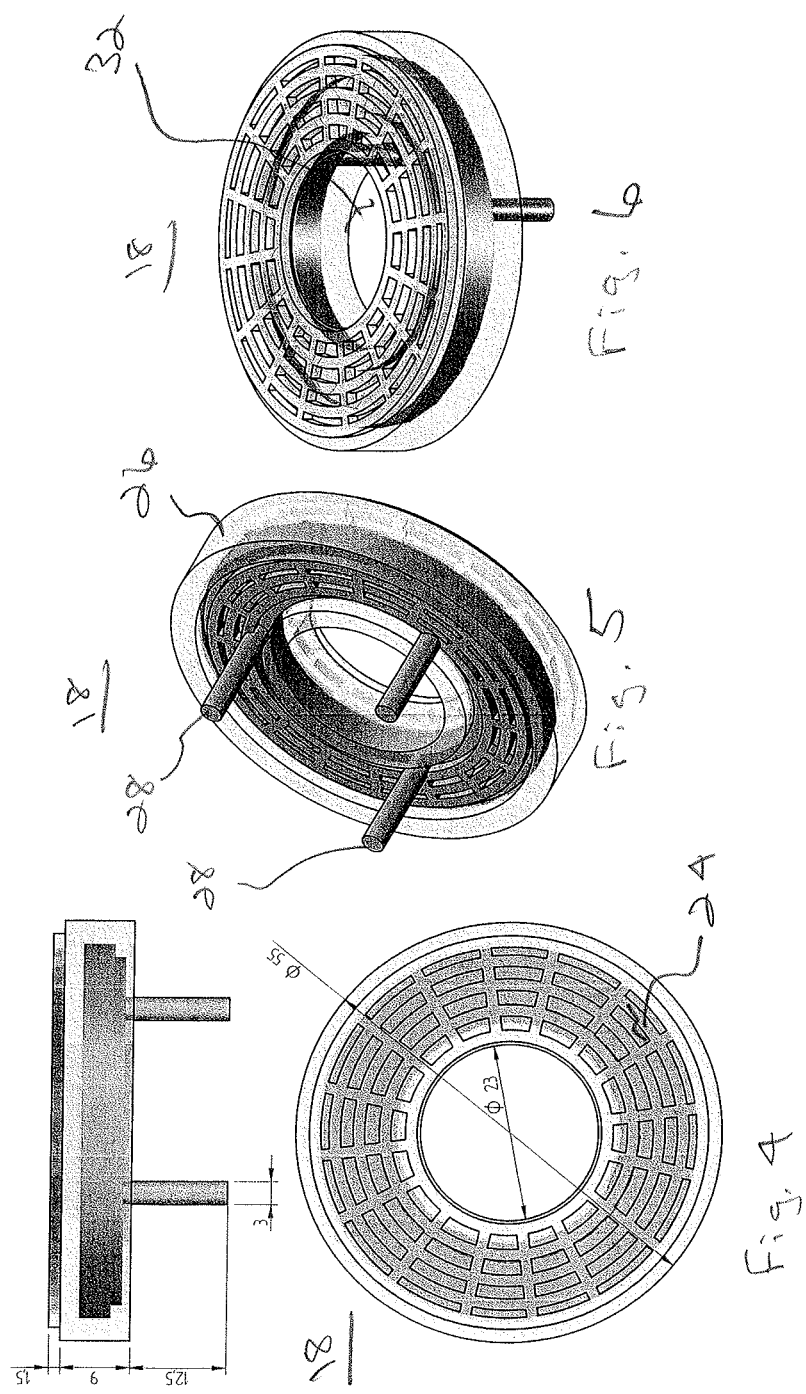

RADIO FREQUENCY AND NEAR FIELD ID TAGS WITH ENLARGED COIL ANTENNA FOR USE WITH SYNTHETIC GRASS MARKERS

TECHNICAL FIELD

The present invention relates to an implantable element for marking a lawn or other grassed and/or sodded area, for the purpose of signaling or marking the surface and underground or nearby features and more particularly, to such a device that includes an external RFID or NFC element along with a large coil antenna mounted externally on the top surface of an implantable device and that allows the implanted element to store certain information about what is being marked and to transmit the stored information to an RFID or NFC reader upon request and activation.

BACKGROUND INFORMATION

Synthetic grass implants for marking grassed or sodded surfaces comprising a body to be set up in the ground and having artificial grass blades protruding above the ground surface, are known, for example, from U.S. Pat. No. 9,147,150, WO 95/12441 and WO02008068296A1, all incorporated herein by reference.

WO 95/12441 discloses an implant/marker comprising a body to sink into the ground, on which are fixed blades of artificial grass. The upper part of the body is installed flush with the ground surface and the lower portion is pointed, its general shape is generally conical. The placement of the implant and its replacement is very easy and does not need to prepare the soil or digging because of its small size. It does not interfere with the traffic of people and vehicles on the marked surface.

The filaments of such devices are usually made from a polymeric material having, after obtaining the desired thickness of the filaments (a few tenths of millimeters to one or two millimeters), the characteristics of rigidity and flexibility to that they are prepared to rest and he bowed to the passage of a user of the land marked without risking injury to the user or damage to the device. Another feature of these devices is that the filaments are resilient and return to their position immediately after the passage of the user.

These devices, originally designed to be implanted on grassy surfaces and guide each tracing land boundaries, such as sports, are proving to be useful for other applications, in particular to provide various marking delineations on the ground. For example locations for campsites, the boundaries of a park or visualizing a path could be achieved by such devices.

Although such prior art implants/markers are very well suited for marking points or even lines in the top surface of grassed areas, they are less useful in marking underground features such as underground electrical lines, underground water, sewer or gas pipes, or other underground or hidden from view features or devices.

Although these prior art markers may provide a visual top surface indication that there is some feature or device located/buried nearby or underneath the marker, the marker does not provide any detailed information such as, for example, what the device or feature is; how deep the device or feature is; how big it is; how long it is; what date it was installed or the like. For such underground or hidden devices or features, it would be advantageous and desirable to have a very detailed information about what the implant/marker is marking.

Prior attempts at incorporating an electronically activatable device such as an RFID tag or the like within the implant/marker have not always been successful. It is sometime difficult to produce an implant/marker that can keep the RFID electronics dry and secure. In addition, an RFID tag that is small enough to be inserted into the center of the implants/markers discussed herein do not have very large antennas and therefore have very limited range.

Accordingly, what is needed is a synthetic grass implant/marker that serves as a surface mounted visual marker for a feature or device located nearby or underground and has all the features and advantages of such a synthetic grass implant, and that additionally includes a device such as an externally attached RFID tag or chip that can programmed with information concerning the feature or device it is marking, and which information can be obtained by utilizing an RFID reader to obtain the stored information from the implant/marker. Such a device should also have a large coil antenna to facilitate the reading and writing of the data to the RFID device.

SUMMARY

The invention features a synthetic grass implant/marker that serves as a surface mounted visual marker for a feature or device located nearby or underground and has all the features and advantages of such a synthetic grass implant, and that additionally includes an externally mounted RFID and coil antenna mounting device having a cavity in which is mounted an RFID device such as an RFID tag or chip that can programmed with information concerning the feature or device it is marking, and which information can be obtained by utilizing an RFID reader to obtain the stored information from the implant/marker, as well as a coil antenna for the RFID device. Legs on the externally mounted RFID and coil antenna mounting device interconnect with holes located in a top surface of the implant/marker to mate the two pieces together.

The synthetic grass implant with external RFID tag and coil antenna for ground marking of grassed surfaces comprises an implant comprising a body portion configured for being placed in ground. The body portion includes first and second ends and a top surface proximate the first end and in which is mounted a plurality of artificial grass strands configured for projecting upwardly therefrom and above a surface of adjacent ground in which the implant is to be inserted. The top surface is disposed substantially flush with said ground surface when said implant is installed in the ground. The top surface includes a plurality of recessed holes. Each of the plurality of recessed holes is configured for being utilized for installing the implant in the ground and for interconnecting with a leg of an externally mounted RFID and coil antenna mounting device. The second end of the body portion has a predetermined tapered shape and size.

The implant further includes an externally mounted RFID and coil antenna mounting device including a main body portion having a top surface, a bottom surface and a cavity in which is disposed an RFID device and an antenna coil electrically coupled to the RFID device. A plurality of support legs are coupled to the bottom surface of the main body portion. Each of the plurality of support legs are configured for interconnecting with one of the plurality of recessed holes in the top surface of the implant body portion.

In one embodiment, the body is conically shaped. The body may also include spirally arranged projections on an exterior surface of at least a portion of the body. The spirally arranged projections are configured to allow insertion of the implant into the ground by a screwing action. In a further embodiment, each of the spirally arranged projections may include an upper and a lower surface, and wherein the upper surface faces the top surface of the implant and has an angle measured from a vertical axis of the implant that is greater than an angle of the lower surface measured from the same vertical axis.

In the preferred embodiment, the RFID device disposed in the cavity may be one of an Active RFID device, a Semi-Passive RFID device and a Passive RFID device.

BRIEF DESCRIPTION OF THE DRAWINGS

These and other features and advantages of the present invention will be better understood by reading the following detailed description, taken together with the drawings wherein:

FIG. 4 is a top view of the externally mounted RFID tag and antenna assembly according to the present invention;

FIG. 5 is a perspective bottom view of the externally mounted RFID tag and antenna assembly according to the present invention FIG. 6 is a front perspective view of the externally mounted RFID tag and antenna assembly according to the present invention.

DETAILED DESCRIPTION OF THE PREFERRED EMBODIMENTS

Figure 1:
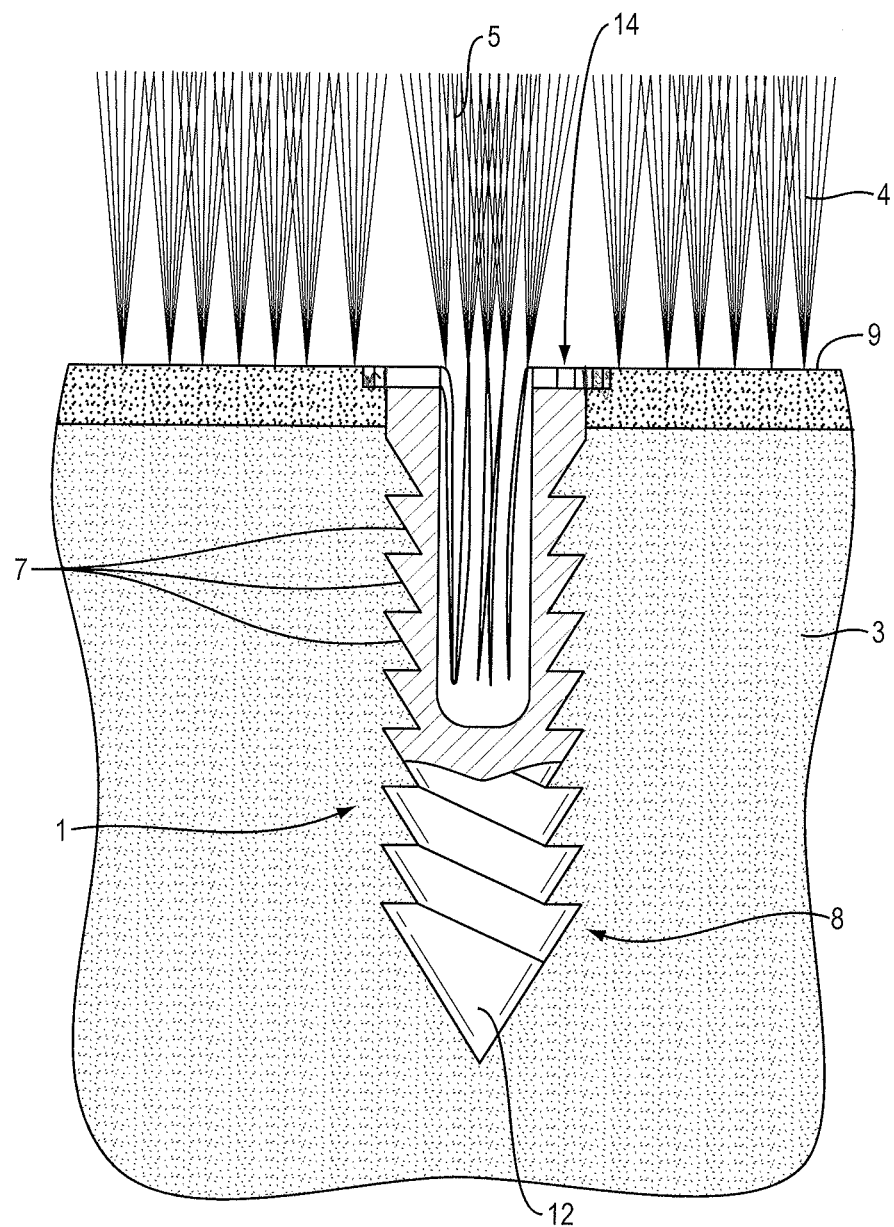
FIG. 1 is a cross-sectional view of an implant device utilized with an RFID tag according to the present invention.

Radio-frequency identification (RFID) is the wireless non-contact use of radio-frequency electromagnetic fields to transfer data, for the purposes of automatically identifying and/or tracking "tags" attached to objects. RFID technology has two components—the reader and the tag. The tags contain electronically stored information. Some tags are powered by and read at short ranges (a few meters) via magnetic fields (electromagnetic induction) while others use a local power source such as a battery, or else have no battery but collect energy from the interrogating electromagnetic field, and then act as a passive transponder to emit microwaves or UHF radio waves (i.e., electromagnetic radiation at high frequencies). Battery powered RFID tags may operate at ranges of hundreds of meters. Unlike a bar code, RFID tags do not necessarily need to be within line of sight of the reader, and may be embedded in the tracked object.

There are several types of RFID devices (often referred to as tags or chips—which terms may be used interchangeably herein) typically referred to as Active, Semi-Passive and Passive RFID Tags. Active and semi-passive RFID tags use internal batteries to power their circuits. An active tag also uses its battery to broadcast radio waves to a reader, whereas a semi-passive tag relies on the reader to supply its power for broadcasting. Because these tags contain more hardware than passive RFID tags, they are more expensive.

Passive RFID tags rely entirely on the reader as their power source. These tags are typically read up to 20 feet (six meters) away, and they have lower production costs, meaning that they can be applied to less expensive merchandise. These tags are manufactured to be disposable.

Most passive RFID tags cost between 7 and 20 cents U.S. each while active and semi-passive tags are more expensive. The RFID industry's goal is to get the cost of a passive RFID tag down to five cents each or less once more merchandisers adopt it. Whereas a railway car might have an active RFID tag, a bottle of shampoo would likely have a passive tag.

Another factor that influences the cost of RFID tags is data storage. There are three storage types: read-write, read-only and WORM (write once, read many). A read-write tag's data can be added to or overwritten. Read-only tags cannot be added to or overwritten—they contain only the data that is stored in them when they were made. WORM tags can have additional data (like another serial number) added once, but they cannot be overwritten. The amount of information that RFID tags store can vary. Passive tags, such as discussed herein typically store about 1024 bytes of information, or 1 kilobyte.

For purposes of the present invention, although passive RFID tags with read-write memory of suitable size is preferred, this is not a limitation of the present invention as any type of RFID tag presently known or that may be developed in the future is considered within the scope of the present invention.

Utilizing RFID technology also requires the use of an RFID reader. The RFID tag reader has two parts—a transceiver and an antenna. The transceiver generates a weak radio signal that may have a range from a few feet to a few yards. The signal is necessary to wake or activate passive tags and is transmitted through the antenna. The signal itself is a form of energy that can be used to power the tag in the case of passive RFID tags.

A transponder is the part of the RFID tag that converts that radio signal transmitted from the reader into usable power, as well as sends and receives messages to and from the RFID tag. The RFID signal transmitted from the reader generates the power for the RFID tag to work with and wakes up the transponder in the RFID tag. The transponder in the RFID tag immediately upon being woken up, sends out all the information it has stored on it. This whole process can take as little as a few milliseconds.

For purposes of this invention, the technology and invention disclosed herein also applies to Near Field Communications (NEC). NEC is a specialized subset within the family of RFID technology. NEC devices operate at the same frequency as RFID readers and tags but typically take advantage of short range limitations of its radio frequency. Because NEC devices must be in close proximity to each other, usually no more than a few centimeters, it has become a popular choice for secure communication between consumer devices such as smart phones.

FIG. 1 shows a marker/implant according to the preferred (but not exclusive) embodiment of the invention and comprises a body 1 of generally cylindrical shape with a conical end 8 having point 2 at its lower end. The body 1 is integrally buried in the soil 3 covering the ground, the lawn or grass being shown generally at 4. The implant or marker 1 according to one feature of the invention includes artificial grass blades 5 protruding from the upper face or surface 6 of the body 1. The upper face or surface 14 of the upper part of the body 1 is substantially flush with the surrounding soil or ground surface 9 when installed. The artificial or synthetic grass strands 5 protrude from this face or surface 14 substantially in parallel with the grass blades 4.

The artificial or synthetic grass strands 5 are fastened in one or more tufts in the body 1 and are anchored in the latter by any suitable means. The outer face of the cylindrical part of the body 1 advantageously includes a saw-tooth edge region 7 which avoids or prevents tearing the implant out of the ground if pulling on the artificial or synthetic grass strands 5. The implant is put in place by sinking it into the ground 3 by any appropriate and suitable means including direct impact on the upper surface 14 of the implant to "drive" the marker 1 into the ground 3 or by screwing it into the ground using the two recesses or indentations 16 in the upper surface 14 as will be described below in connection with FIG. 2. The markers 1 may be installed from place to place, along a line of any shape, or along a perimeter of any shape, to mark the surface of a lawn or other grassy area or to mark an underground and/or nearby buried feature that cannot be seen such as a pipe, wire, junction box or the like.

The synthetic grass strands 5 may be of any desired color. For example, a particular color may be used for a marker which is denoting a gas line while a different color may be used to denote an electric line. In addition, if the marker is often sought after dark, the synthetic grass strands 5 may include a fluorescent or luminescent element which assists in locating the marker after dark.

Figure 2:
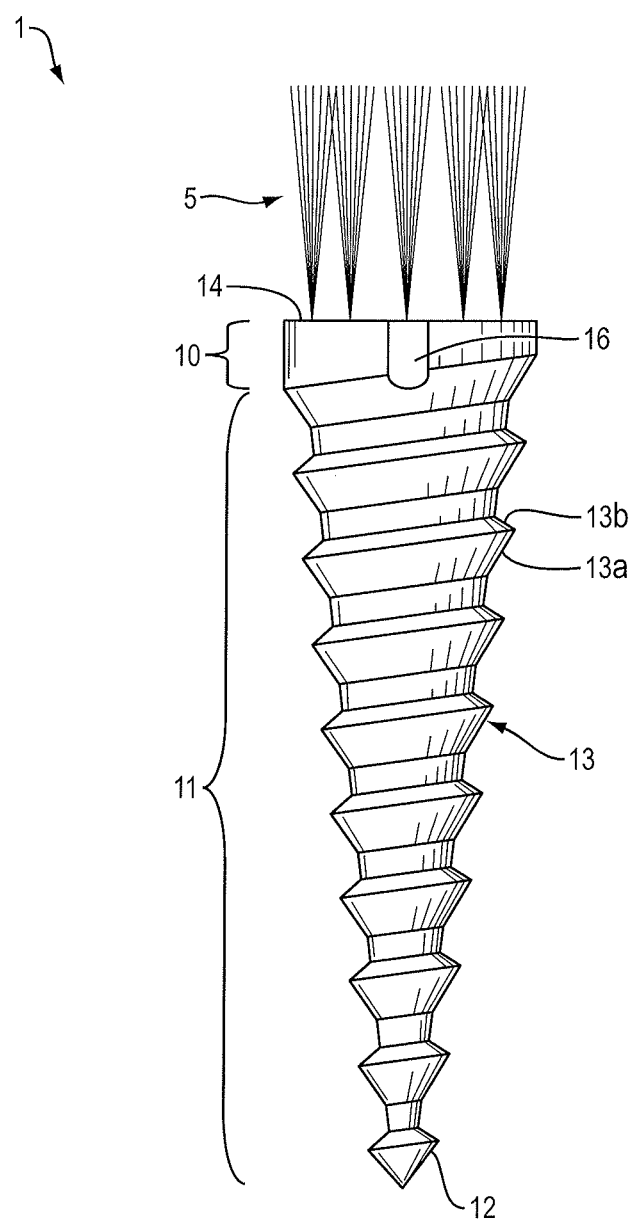
FIG. 2 is a perspective front view of another embodiment of an implant device which may be utilized to carry out the invention disclosed herein.

FIG. 2 illustrates a preferred (but not limiting) embodiment of the implant/marker that is utilized with the present invention, wherein the body includes an upper cylindrical portion 10 in which the synthetic grass strands 5 are anchored and a lower portion 11 of generally conical shape with a tip 12 at the lower end and a screw thread 13 from one end to the other of said lower part 11.

The screw thread 13 profile is asymmetrical that is, the lower face 13a is substantially inclined relative to the vertical axis of the implant and also the upper face 13b of the screw thread 13, so that the net effect of the lower face 13a and the upper face 13b of the screw thread 13 is to simultaneously provide holding of the implant 1 in the ground and preventing accidental wrenching or removal of the implant from the ground.

The upper surface 14 of the marker 1 is generally flat, and has a number of blind holes (not shown) evenly distributed and in which are attached small clumps of synthetic grass strands 5. For example, it is expected that nine holes 15 each receiving a tuft comprising of some number of strands 5, about 12 being preferable, a few centimeters (5 for example) long. The strands 5 are flexible enough that they can be walked or driven on and a grass shearing device such as a lawn mower can be passed over the strands 5 without risk of accident, injury or damage to the strands.

In general, the density of strands 5 is very loose because the implant/marker 1 performs a signaling or marking function and is not designed for the establishment of an artificial line marking. Density, seen at the free ends of the strands 5 is, for example, less than ten per square centimeter.

The portion 10 has a length of on the order of a few centimeters, for example 3.5 cm, while the height of the body of the implant (10, 11) in total is of the order of ten centimeters. The whole of the implant body 1 is advantageously made in one piece by molding a suitable plastics material. The implant of FIG. 2 may be installed by screwing it into the ground using a suitable fork shaped tool having two "fingers" cooperating with two or more recesses or indentations 16 at predetermined positions around the periphery of the face 14 of the marker 1. The insertion and potential withdrawal of the implant (if needed) is accomplished by screwing or unscrewing the implant, an action that is very simple, easy and does not involve any digging or mishandling of the lawn, thus preserving its integrity.

The implants or markers 1 of the invention, whether they are the embodiment shown or any other embodiment, may be used singularly or may be placed at regular intervals along a line or boundary to mark the grass or lawn surface. The implant/marker 1 of the invention may also be used for permanent indications on a lawn or other grassy area of any object or structure hidden beneath the surface, such as a pipe, valve, septic tank, electrical wire, etc. wherein it is important to know the location of such object or structure.

Figure 3:
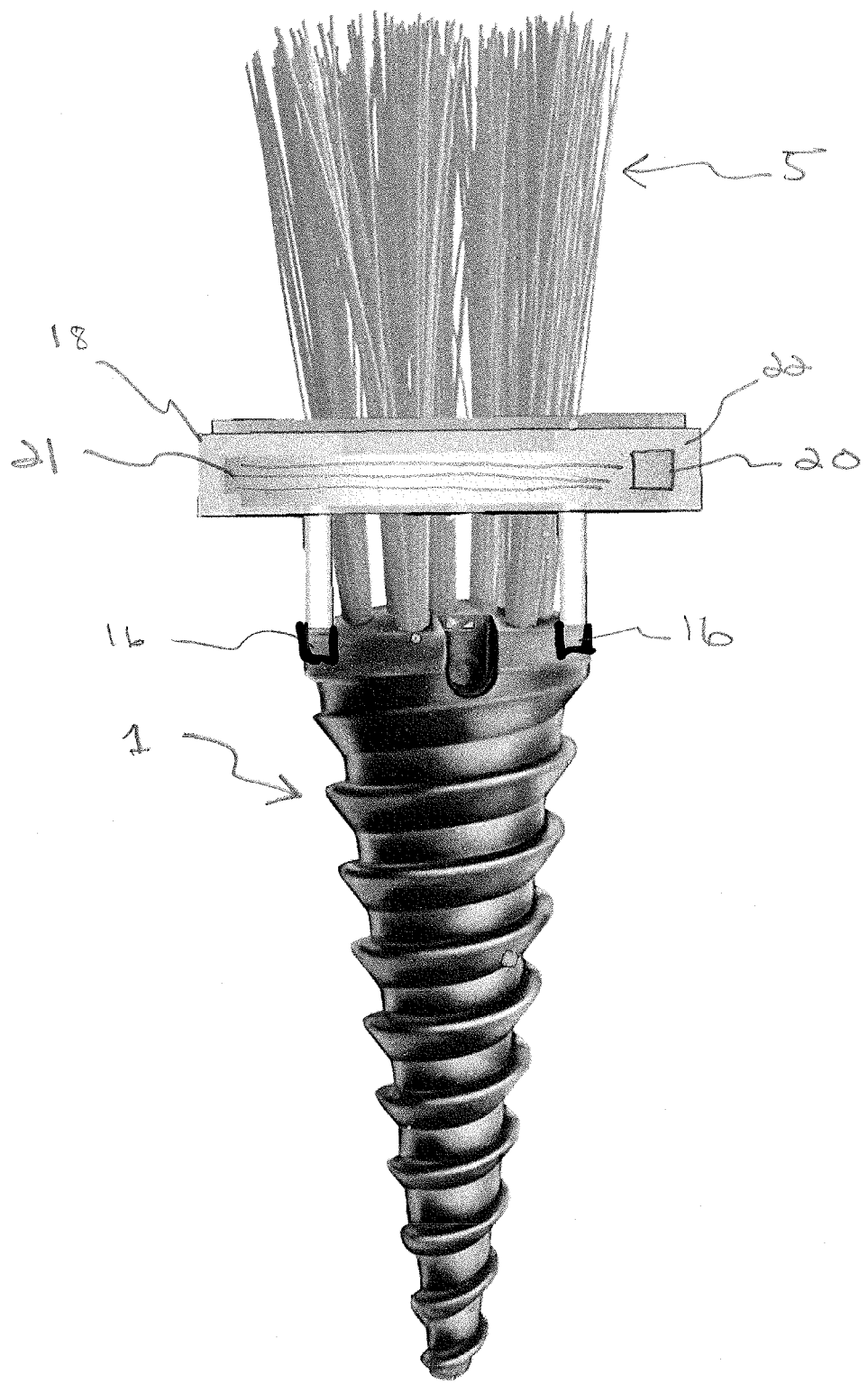
FIG. 3 is a side view of an implant device utilized with an externally mounted RFID tag and antenna assembly according to the present invention.
Figure 7:
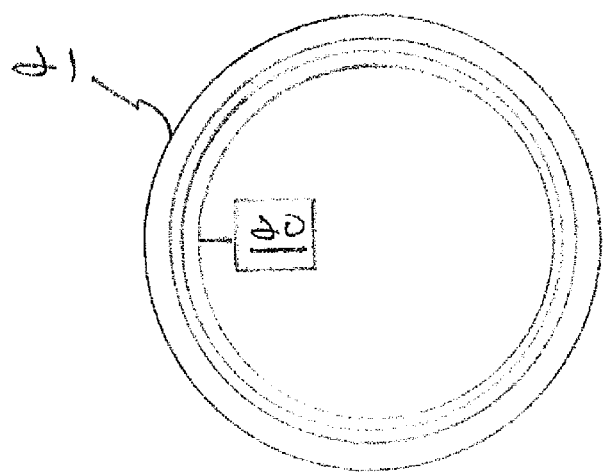
FIG. 7 is a schematic view of the internal antenna and RFID tag embedded in the externally mounted RFID tag and antenna assembly according to the present invention.

As previously discussed, the present invention features a marker 1, FIG. 3, of the type described herein or of a different type which includes an RFID tag or chip 20 along with a coil antenna 21 located or disposed inside a cavity 22 formed in the interior of an externally mounted RFID and coil antenna mounting device 18 which removably interconnects with the top surface 14 of the body portion of the marker 1.

The externally mounted RFID and coil antenna mounting device 18 shown in greater detail in FIGS. 4-6 is made of plastic or other similar material. The main body portion 26 of the device 18 that houses the RFID tag 20 and the antenna coil 21 is approximately 10 mm in thickness while the legs or stand-offs 28 are approximately 12.5 mm in length and also made of plastic or other material preferably integral with the body portion 26.

Located inside the main body portion 26 of the externally mounted RFID and coil antenna mounting device 18 is the RFID electronics 30 including an RFID tag 20 and an antenna coil 21. The electronics may also include a memory chip (not shown) as well as any other support electronics/components needed to formulate the RFID features of the invention.

In use, the externally mounted RFID and coil antenna mounting device 18 in located on the top surface 14 of the implant 1 once the implant 1 has been inserted or implanted in the ground (as shown in FIG. 1). The central circular region 32 of the externally mounted RFID and coil antenna mounting device 18 is inserted over the synthetic grass strands 5 of the implant 1. The legs 28 of the externally mounted RFID and coil antenna mounting device 18 are inserted into the holes 16 in the top surface 14 of the implant. The legs 28 are sized and shaped to frictionally engage with the holes 16 and relatively securely maintain the externally mounted RFID and coil antenna mounting device 18 on the implant 1.

The RFID tag may be any type of RFID device as described above as desired by the user. It is contemplated that the type of information which may be stored on the RFID tag includes but is not limited to information describing the marked object or device (such as a water pipe, electrical pipe, valve, sewer pipe or the like); its size, length or the like; its installation date; last service date; its GPS coordinates; its orientation using GPS coordinates or the like; and any other relevant information that would assist someone in utilizing the marker 1 to ascertain desired and/or required information about the object being marked. In this manner, since such objects being marked are typically not visible, a user gains valuable insight into the object being marked.

Although the marker 1 of the present invention is typically installed in a horizontal grassed area, it is not necessary that the object being marked be below the surface of the grassed area but rather, a marker 1 in accordance with the teachings of the present invention may be installed in a grassed area to mark an object in an adjacent wall or other vertical structure.

Accordingly, the present invention provides a novel and nonobvious marker that can be installed in a grassed area without fear of causing injury to a user or vehicle which comes in contact with the synthetic grass elements in the marker but which can provide significant valuable information about one or more objects being marked by the marker.

The invention is not limited to the embodiments described and illustrated but covers all variants in particular with regard to the shape and dimensions of the upper portion 10 of the implant body, which may have, for example, a polygonal profile, and the lower part 11 which may be cylindrical or conical, smooth, with or without anti-stripping projections, regardless of their shapes and arrangements. Similarly, the number, location, size or color of strands 5, their mode of attachment to the implant body, and the nature of their constituent material can vary within wide limits without departing from the scope of the present invention.

Modifications and substitutions by one of ordinary skill in the art are considered to be within the scope of the present invention, which is not to be limited except by the allowed claims and their legal equivalents.

The invention claimed is:

1. A synthetic grass implant with external RFID tag and coil antenna for ground marking of grassed surfaces, comprising:
   an implant comprising a body portion configured for being placed in ground, said body portion including first and second ends, said body portion including a top surface proximate said first end and in which is mounted a plurality of artificial grass strands configured for projecting upwardly therefrom and above a surface of adjacent ground in which the implant is to be inserted, said top surface disposed substantially flush with said ground surface when said implant is installed in the ground, said top surface including a plurality of recessed holes, each of said plurality of recessed holes configured for being utilized for installing said implant in said ground and for interconnecting with a leg of an externally mounted RFID and coil antenna mounting device, said second end of said body portion having a predetermined tapered shape and size; and
   an externally mounted RFID and coil antenna mounting device including a main body portion having a top surface, a bottom surface and a cavity in which is disposed an RFID device and an antenna coil electrically coupled to said RFID device, a plurality of support legs coupled to said bottom surface of said main body portion, each of said plurality of support legs configured for interconnecting with one of said plurality of recessed holes in said top surface of said implant body portion.

2. The implant according to claim 1, characterized in that said body portion is conically shaped.

3. The implant according to claim 1, wherein said body portion includes spirally arranged projections on an exterior surface of at least a portion of said body, said spirally arranged projections configured to allow insertion of the implant into the ground by a screwing or rotational motion.

4. The implant according to claim 3, wherein each said spirally arranged projection includes an upper and a lower surface and wherein said upper surface faces said top surface of the implant and has an angle measured from a vertical axis of said implant that is greater than an angle of said lower surface.

5. The implant of claim 1 wherein said RFID device disposed in said cavity is selected from the group of RFID devices consisting of an Active RFID device, a Semi-Passive RFID device and a Passive RFID device.

* * * * *